United States Patent [19]

Liebel et al.

[11] Patent Number: 4,850,472
[45] Date of Patent: Jul. 25, 1989

[54] CONVEYOR APPARATUS

[75] Inventors: Christian Liebel, Burgthann; Udo Meyer, Nürnberg, both of Fed. Rep. of Germany

[73] Assignee: GMN Georg Muller Nurnberg GmbH, Fed. Rep. of Germany

[21] Appl. No.: 157,924

[22] Filed: Feb. 19, 1988

[30] Foreign Application Priority Data

Feb. 21, 1987 [DE] Fed. Rep. of Germany ....... 3705561

[51] Int. Cl.⁴ ............................................. B65G 47/24
[52] U.S. Cl. .................................. 198/409; 198/468.8; 198/465.3
[58] Field of Search ...................... 198/409, 413, 465.3, 198/468.6, 468.8, 803.2

[56] References Cited

U.S. PATENT DOCUMENTS

| | | | |
|---|---|---|---|
| 4,671,402 | 6/1987 | Inoue ................................ | 198/465.3 |
| 4,712,665 | 12/1987 | McDonald et al. ............... | 198/468.8 |
| 4,723,356 | 2/1988 | Sakamoto et al. ................ | 198/468.8 |
| 4,750,605 | 6/1988 | Brems et al. ...................... | 198/468.8 |
| 4,763,773 | 8/1988 | Kawarabashi et al. ............ | 198/409 |

FOREIGN PATENT DOCUMENTS 2231225 1/1974 Fed. Rep. of Germany ...... 198/413

Primary Examiner—Joseph E. Valenza
Attorney, Agent, or Firm—Steinberg & Raskin

[57] ABSTRACT

Conveyor apparatus includes at least two conveyors, each comprising a pair of longitudinal conveyor members, situated in different horizontal planes on which workpiece carriers are supported for conveyance. Each workpiece carrier has at least one longer outer dimension, e.g. length, greater than the distance between the conveyor members of one of the conveyors and at least one shorter outer dimesnion, e.g. width, less than the distance between the conveyor members of at least one of the conveyors. The apparatus further includes an arrangement for transferring the workpiece carriers between the conveyors including a device for rotating or pivoting a workpiece carrier to an angular position wherein the shorter outer dimension is aligned transversely with respect to the conveyor members of the conveyor on which it is supported so that the workpiece carrier can fit between them, and a lift device for moving the workpiece carrier from the conveyor on which it is supported to the other conveyor with the workpice carrier moving between the conveyor members of the former.

7 Claims, 6 Drawing Sheets

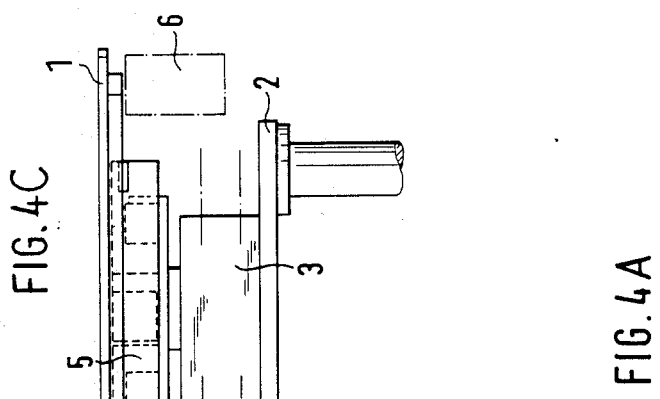
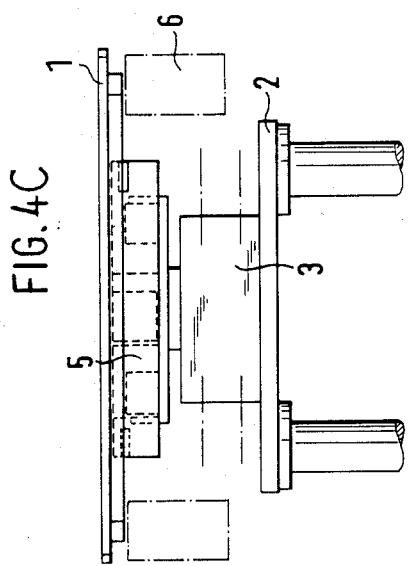
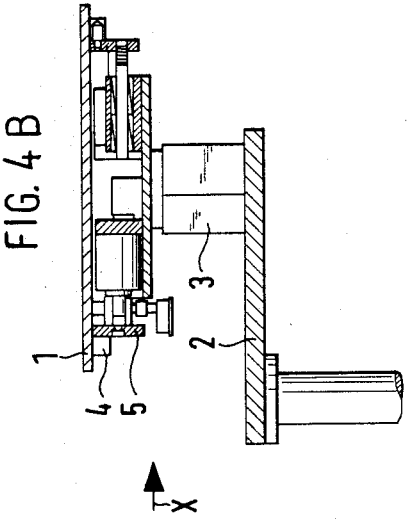

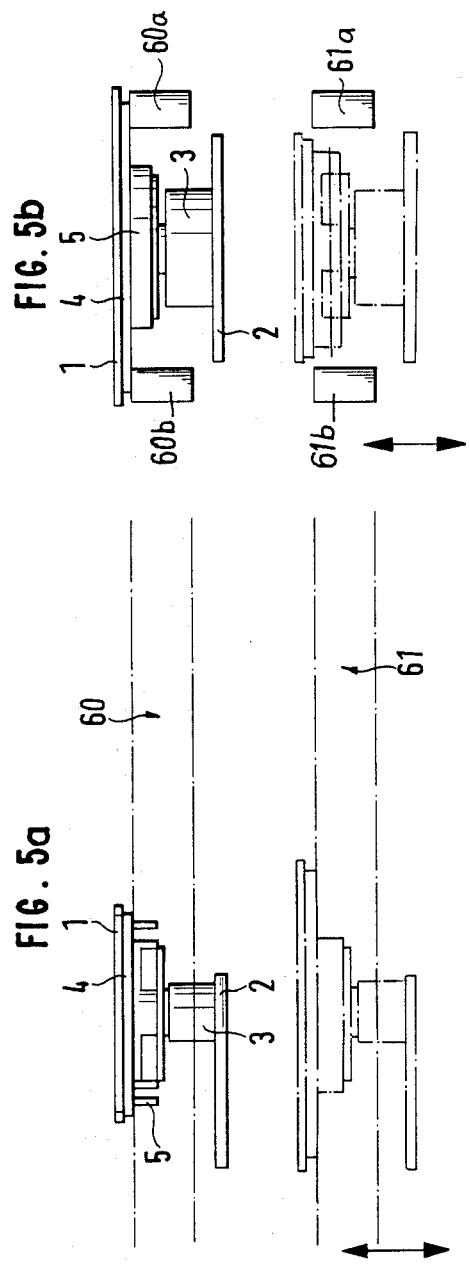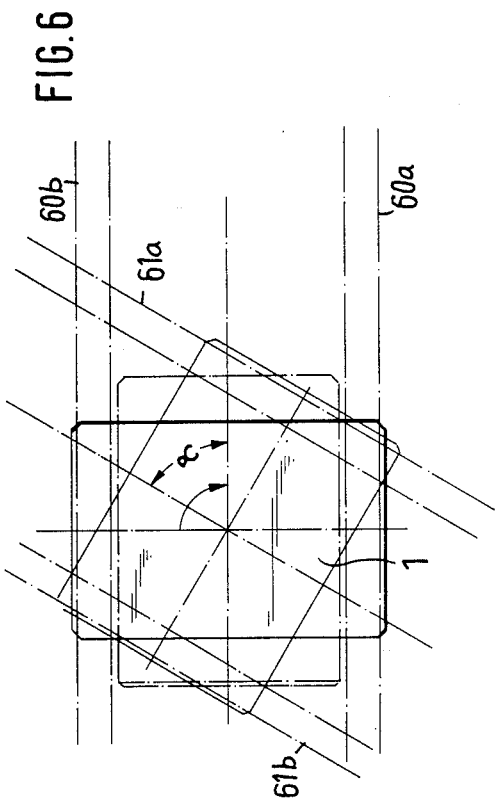

CONVEYOR APPARATUS

BACKGROUND OF THE INVENTION

This invention relates generally to conveyor apparatus and, more particularly, to double-member or rail conveyor apparatus, such as retarding roll chain conveyors or twin-belt conveyors on which workpiece carriers are supported on the longitudinal conveyor rails or members for conveyance thereon.

Double rail conveyor apparatus of this type are well known. One problem in the operation of such conveyor apparatus is in the return of the workpiece carriers to their starting positions. Although this is generally not a problem in carousel-type conveyors in which a conveyor belt or the like circulates in a closed path in a single plane, such conveyors cannot be used in all applications due to their large space requirements.

Conveyor apparatus have been suggested wherein the workpiece carriers are supported on longitudinal rails, such as belts, in such a manner that upon reaching the end of their run, they are turned upside-down and returned to their starting positions on the lower run of the belts. Such apparatus, however, can be used for only certain specific applications and are not suited for conveying large, heavy pallets or the like since the pallets or workpiece carriers are too heavy to be conveyed back to their original starting point on the lower run of the conveyor belts.

For these reasons, it has been conventional to accomplish the return of the workpiece carriers being conveyed in a longitudinal direction to their starting positions by providing lifting devices, either at the ends of the conveyor or at intermediate locations along the conveyor, which remove the workpiece carriers from the conveyor in a lateral or transverse direction whereupon the workpiece carrier is transferred by lift apparatus to a level above or below the conveyor where it is again shifted laterally and placed on a second conveyor for the return conveyance. Besides being extremely complex in construction, especially where the workpiece carriers must be transferred to the return conveyor at several intermediate locations, a significant amount of space is required on the sides of the conveyor to accomplish the lateral shifting of the workpiece carriers.

In another conventional conveyor apparatus used in transporting articles having rigid bottom plates with sliding carriers, the carriers are supported in closely adjacent relationship on upper and lower belts so as to push each other along a horizontal conveyance path. Lifting conveyors are provided at both ends of the conveyor for transferring the sliding carriers from one conveyor belt to the other. This arrangement has the drawback that the carriers are moved forwardly with one carrier pushing against the next closely spaced adjacent carrier, from the first to the last carrier thereby increasing the possibility of empty carriers being conveyed. The carriers cannot be spaced from each other as is required with loose chain storage systems.

Another conventional conveyor construction comprises roller conveyors provided with lifting stations at the starting and ending points thereof. Such construction has the drawback that drive elements are required to move the workpiece carriers to the lifting stations from the conveyor and from the lifting stations to the conveyor. Another serious drawback of such a construction is that in the case where several loading/unloading sites are required between the starting and ending points, it is necessary to provide several lifting stations and associated drive stations between the lifting stations at each site.

Conveyors are also known which utilize workpiece carriers whose width is adjustable so that the carriers can be moved vertically between lateral longitudinal conveyors with an adjustable lift to conveyor planes at different levels. Such constructions, however, have the drawback that each individual workpiece carrier must have lateral bearing rails fastened to it or transversely shiftably supported guide pins which are moved apart and together through an adjusting device.

Moreover, conveyor apparatus of this type have numerous moving parts and are complicated and expensive in construction and have the additional disadvantage that, for example, with conveyor systems forming a square or which are arranged at other angles with respect to each other, considerable modifications must be made to redirect the workpiece carriers around the corners into a new conveying direction.

Furthermore, it is not possible using this construction to pivot the workpiece carriers around their central vertical axes into appropriate orientations, such as for loading or unloading or for simple assembly operations.

SUMMARY OF THE INVENTION

Accordingly, it is an object of the present invention to provide new and improved conveyor apparatus.

Another object of the present invention is to provide new and improved conveyor apparatus by which workpiece carriers can be returned to their starting points in a simple manner.

Still another object of the present invention is to provide new and improved conveyor apparatus by which workpiece carriers can be returned to their starting positions without requiring additional space for the conveyor apparatus.

A further object of the present invention is to provide new and improved conveyor apparatus by which each workpiece carrier can be pivoted or rotated around its central vertical axis such, for example, as during loading/unloading operations, or for assembly operations.

Briefly, in accordance with the present invention, these and other objects are attained by providing conveyor apparatus including at least two conveyors, each comprising a pair of longitudinal conveyor members, situated in different horizontal planes and on which workpiece carriers are supported for conveyance. Each workpiece carrier has at least one longer outer dimension, e.g. length, greater than the distance between the conveyor members of one of the conveyors and at least one shorter outer dimension, e.g. width, less than the distance between the conveyor members of at least one of the conveyors. An arrangement for transferring the workpiece carriers between the conveyors is provided which includes a device for rotating or pivoting a workpiece carrier to an angular position wherein the shorter outer dimension is aligned transversely with respect to the conveyor members of the conveyor on which it is supported so that the workpiece carrier can be fit between them, and a lift device for moving the workpiece carriers from the conveyor on which it is supported to another conveyor with the workpiece carrier moving between the conveyor members of the former.

The construction of the invention results in considerable savings in space, especially in the lateral or transverse direction, even in the case where the transverse distance between the conveyor members of a conveyor is increased to provide sufficient clearance to accommodate the greatest width of the workpiece carriers.

In a preferred embodiment of the invention, each workpiece carrier is provided with a pair of rails on its underside which function to index the workpiece carrier on the transfer arrangement, i.e. to fix the workpiece precisely on the transfer arrangement and to insure transmission of forces for the rotation or pivoting of the workpiece carrier around its vertical axis. It is understood, that other means may be used to fasten the workpiece carriers to the transfer arrangement, such as a vacuum suction device, a collet chuck or the like.

In a basic embodiment of the invention, the workpiece carriers are rotated about 90° and the rotation and vertical movement of the workpiece carriers can be carried out using pneumatic or hydraulic drives over dead stops. Alternatively, the extent to which the workpiece carrier is pivoted about its vertical axis can be selectively programmed so that the workpiece carrier can be rotated into any desired angular orientation. The apparatus for carrying out the invention is relatively simple in construction and permits flexible adaptation of the apparatus to particular applications.

Thus, in accordance with the invention, the workpiece carriers or pallets can be transferred from a longitudinally advancing upper belt conveyor to a longitudinally returning lower belt conveyor while at the same time the workpiece carriers and workpieces held thereon can be pivoted around their vertical axis into an angular orientation most suited for loading or other handling or assembling steps.

Since the invention provides the capability of rotating the workpiece carrier about its central axis, a conveyor system can be constructed in the form of a square or rectangle, i.e. so that the workpiece carriers are transferred from one longitudinal conveyor to another longitudinal conveyor which forms a right or any other desired angle with the first conveyor.

The design of the conveyor apparatus of the invention enables the use of workpiece carriers which are not much more costly than conventional workpiece carriers. This is a significant advantage, especially in larger conveyor installations in which large numbers of workpiece carriers are required.

It is also an advantage of the invention that the workpiece carriers can be transported with their larger outer dimensions oriented transversely with respect with the longitudinal direction of transport. This decreases the transport time per workpiece carrier relative to conventional conveyor apparatus in which the workpiece carriers are oriented with their longer dimensions oriented longitudinally and compensates for the somewhat greater lateral space required for constructions according to the invention, especially since the transport lines are usually located overhead.

Another important advantage of longitudinal conveyor apparatus constructed in accordance with the invention is that assembly lines or storage lines can be operatively associated with the same at its end point or at any points intermediate its starting and ending points, since the workpiece carriers conveyed on the apparatus can be removed therefrom at any intermediate site and transferred to another longitudinal conveyor arranged at any angle thereto.

DESCRIPTION OF THE DRAWINGS

A more complete appreciation of the present invention and many of the attendant advantages thereof will be readily understood by reference to the following detailed description when considered in connection with the accompanying drawings in which:

FIG. 4A is a plan view, partially broken away, of a workpiece carrier coupled to a transfer arrangement in accordance with the invention;

FIG. 4B is a view taken along line A-B of FIG. 4A;

FIG. 4C is a side elevation view of the arrangement shown in FIG. 4B taken in the direction of arrow X;

FIGS. 5A and 5B are side and end views showing the transfer of workpiece carriers to longitudinal conveyors on different planes;

FIG. 6 is a schematic illustration showing the pivoting motion of a workpiece carrier in accordance with the operation of conveyor apparatus constructed in accordance with the invention;

DESCRIPTION OF THE PREFERRED EMBODIMENTS

Figure 1:
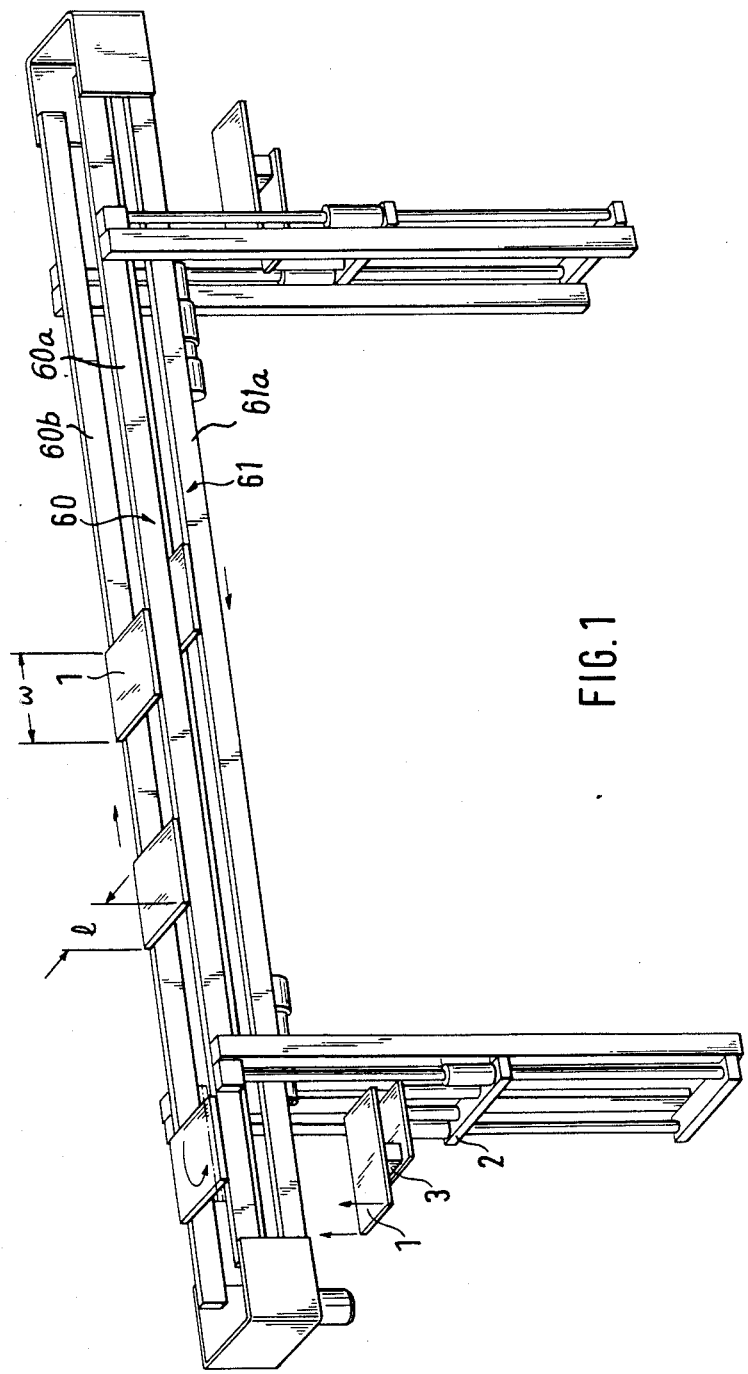
FIG. 1 is a perspective view of a basic preferred embodiment of conveyor apparatus in accordance with the invention including two longitudinal conveyors arranged one above the other to function as advance and return lines respectively and also illustrating two lifting stations in accordance with the invention.

Referring now to the drawings wherein like reference characters designate identical or corresponding parts throughout the several views, and more particularly to FIG. 1, a basic conveyor system in accordance with the invention is illustrated which includes first and second, i.e. upper and lower, longitudinal conveyors 60 and 61 extending parallel to each other. Each conveyor can comprise a retarding roller chain conveyor, a belt conveyor, or the like, and includes a pair of longitudinal conveyor members 60a, 60b; 61a, 61b having elongate parallel runs which are transversely spaced from each other by a transverse distance. The conveyor 60 functions to transport workpieces, such as between processing, assembling, loading and/or unloading stations. The workpieces, workpiece handling devices, processing stations and the like are omitted from the illustration for the sake of clarity. The workpieces are carried on workpiece carriers 1 which are adapted for the equipment and workpieces of the particular application. The conveyor 61 is arranged in a plane below conveyor 60 and functions to return the workpiece carriers 1 to their original starting points.

According to the invention, the first conveyor members 60a and 60b of the first or upper conveyor 60 are transversely spaced from each other by a first transverse distance while the second conveyor members 61a and 61b (not shown) are spaced from each other by a second transverse distance, which may or may not be the same as the first transverse distance. Each workpiece carrier 1 has at least one longer outer dimension which is greater than the first transverse distance and at one shorter outer dimension which is less than at least one of the first and second transverse distances. In the illustrated embodiment, each workpiece carrier 1 has a rectangular shape with its length l being greater than the transverse distance between conveyor members 60a and 60b and with its width w being less than that transverse distance. As each workpiece carrier 1 is transported on conveyor 60, it is bilaterally supported on the first conveyor members 60a and 60b with its length l aligned in the transverse distance so that the workpiece carriers are supported by both of the conveyor members 60a and 60b.

By this arrangement, it is seen that each workpiece carrier 1 can, by means of a transfer arrangement 2, be pivoted around its vertical axis until its shorter width dimension w is aligned in the transverse direction and is transferred between the first conveyor members 60a and 60b by a lift device to the second or lower conveyor 61. Indexing of the workpiece carriers 1 in the transfer arrangement 2 is facilitated by a pair of transversely moving indexing rails 5, best seen in FIGS. 4A–4C, which engage indexing strips 4 on the underside of each workpiece carrier 1. As seen in FIGS. 4A–4C and FIGS. 5A and B, the indexing strips 4 simultaneously function as means for protecting each workpiece carrier against wear and tear and for supporting each workpiece carrier on the conveyor members of each respective conveyor.

Figure 7:
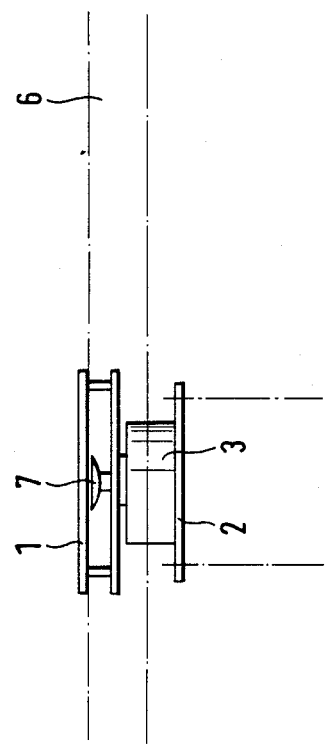
FIG. 7 is a schematic illustration of the indexing of a workpiece carrier on another embodiment of a transfer arrangement in accordance with the invention which uses suction or magnet devices.
Figure 8:
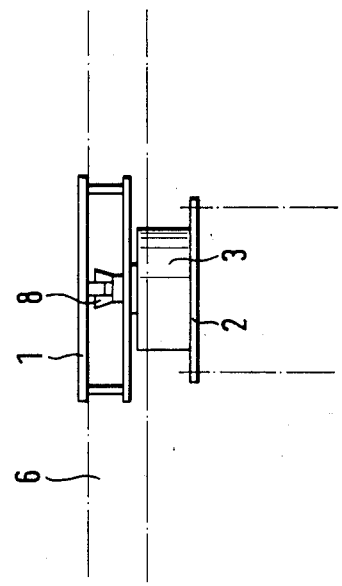
FIG. 8 is a schematic illustration of the indexing of a workpiece carrier on another embodiment of a transfer arrangement in accordance with the invention which utilizes a collet chuck.

In the embodiment illustrated in FIG. 7, the workpiece carriers 1 are coupled to the transfer apparatus 2 by means of suction cups 7. Alternatively, the workpiece carriers 1 are coupled to the transfer apparatus 2 by means of a collet chuck 8.

Referring to FIGS. 5A and B, the transfer of a workpiece carrier 1 from the conveyor members 60a, 60b of a conveyor 60 in one conveying plane to the conveying members 61a, 61b of a conveyor 61 in another conveying plane is schematically illustrated. In this arrangement, the workpiece carrier 1 can be readily transported away on the conveyor member 61a, 61b of conveyor 61 forming any particular angle $\alpha$ with the member 60a, 60b of conveyor 60.

The rotation or pivoting of workpiece carrier 1 is accomplished by a rotation module 3 supported on transfer arrangement 2. In the basic embodiment illustrated, the rotation module 3 carries out a fixed, constant pivoting angle o defined between the longitudinal conveyors 60, 61 situated in the vertically displaced planes.

In accordance with other embodiments, the rotation module 3 can be a selectively programmable unit in which case it is possible to pivot workpiece carriers 1 around their vertical axis into any angular orientation. This construction permits arranging longitudinal conveyors 60, 61 (FIG. 6) or 62, 63, 64, 65 (FIG. 2) at any angle with respect to each other.

Figure 2:
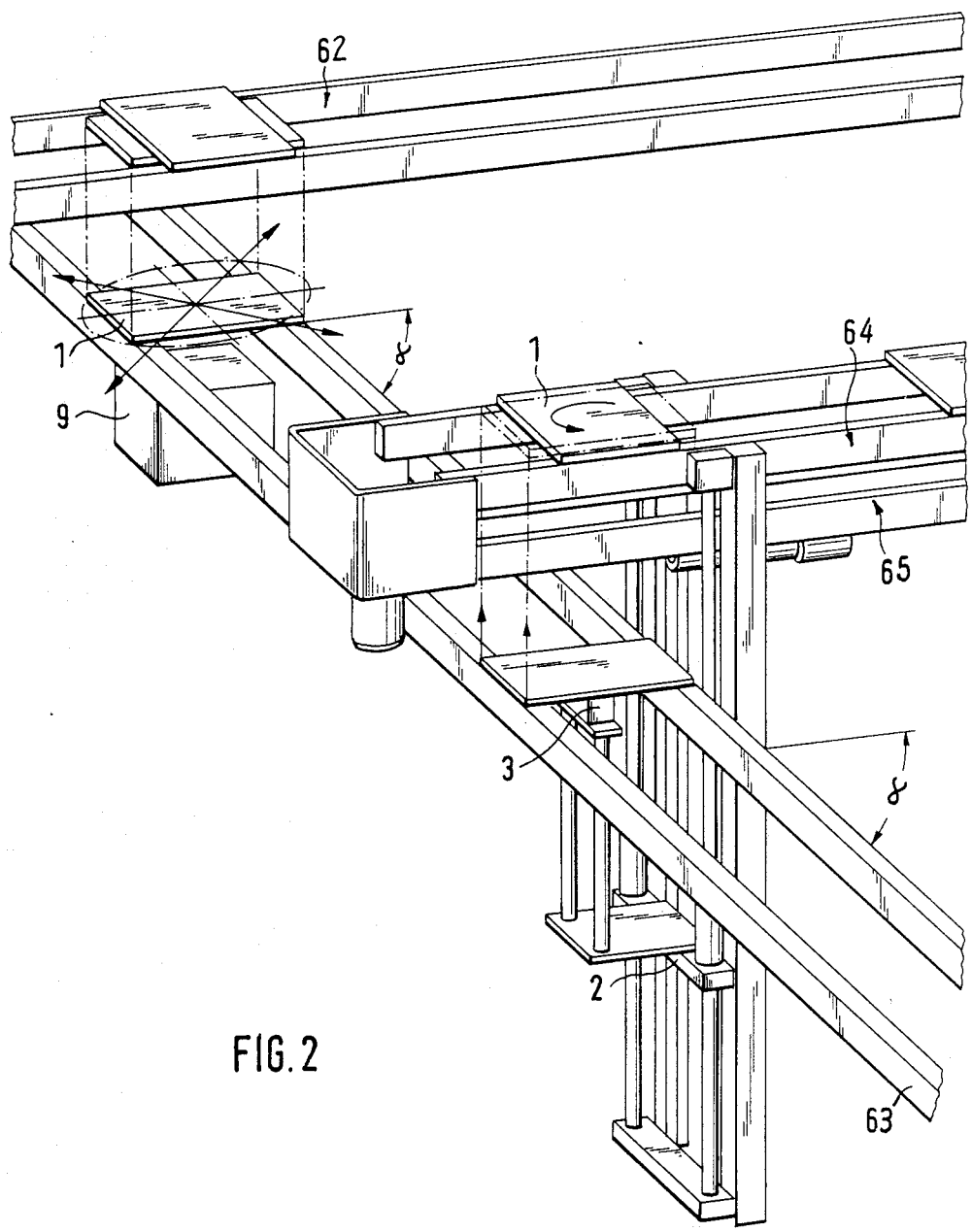
FIG. 2 is a perspective view of conveyor apparatus in accordance with the invention and also illustrating a lifting station used in conjunction with a square or rectangular conveyor system.

Referring to FIG. 2, a conveyor system having a U-shaped design is illustrated in which workpiece carriers 1 are located with workpieces on the longitudinal conveyor members 62a, 62b of an upper conveyor 62. The workpiece carriers 1 are transferred by transfer arrangement 2 (not shown) from the plane of conveyor 62 and, after a 90° rotation, are shifted downwardly and transferred to conveyor 63 forming an angle $\alpha$ with conveyor 62. The workpiece carrier 1 can be redirected from conveyor 63 into another direction depending, for example, on the programming of the system. For this purpose, the workpiece carrier is pushed up, for example, by a pneumatic lifting station 9, and deposited in another conveyor forming an angle with conveyor 63.

Storage lines, distribution stations, or collecting stations can be provided through appropriate arrangement of longitudinal conveyors. For example, workpiece carriers 1 loaded with workpieces can be conveyed while supported on longitudinal conveyors situated in different planes arranged one above the other. These longitudinal conveyors need not extend parallel to each other as shown but may extend at any angle with respect to each other as desired. In this manner, workpieces can be supplied to various post-processing stations.

Figure 3:
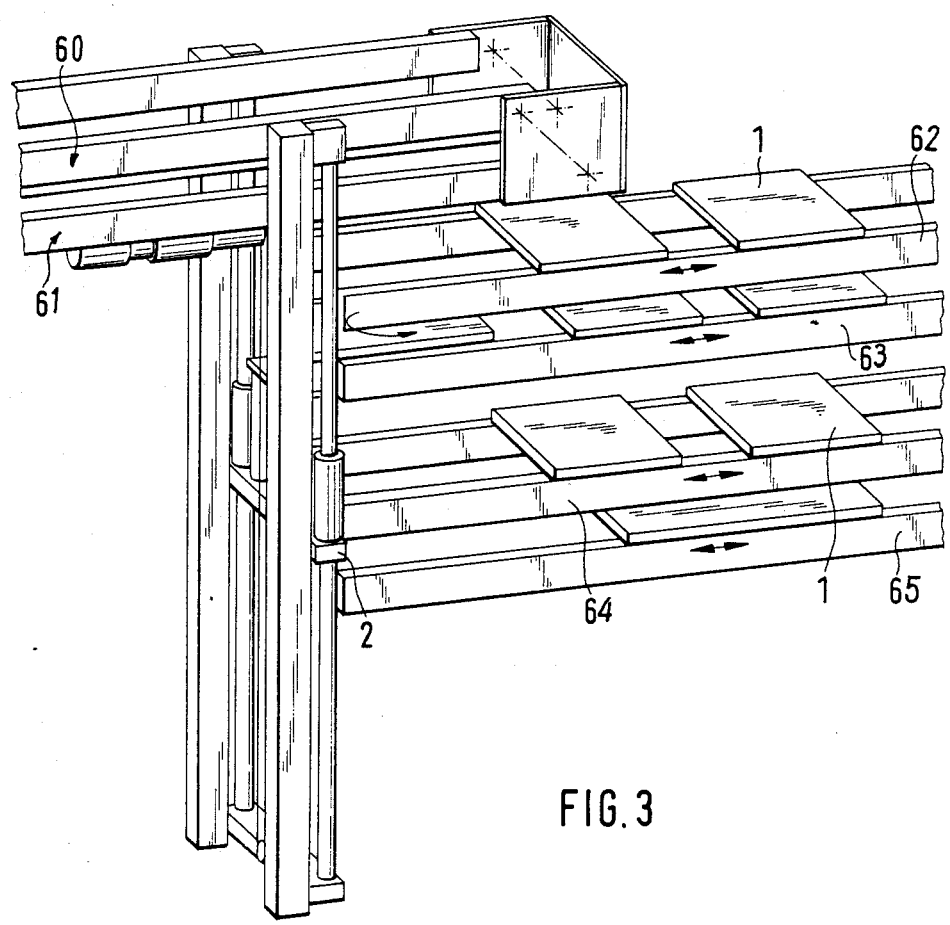
FIG. 3 is a perspective view of conveyor apparatus in accordance with the invention including a conveyor with a following multi-lane storage line comprising longitudinal conveyors arranged one above the other, and also illustrating a lifting station.

Referring to FIG. 3, an arrangement of longitudinal conveyors 60–65 and transfer arrangements 2 suitable for use as storage and stocking transport lines for loading workpiece carriers 1 are illustrated. A workpiece carrier 1 carrying workpieces is fed on an upper conveyor 60 and can be transferred to conveyor 61 situated below conveyor 60 for storage. The filled workpiece carriers 1 can be returned to conveyor 60 and conveyed on one of the lower conveyors 62–65 for processing or further use. The transfer apparatus in each case is the unit 2.

As shown in FIG. 6, the workpiece carrier can be moved on the transfer arrangement 2 at any angle with respect to its vertical axis, such as for loading or unloading the workpieces. This enables the grippers normally used in unloading equipment to be dispensed with.

Additionally, it is possible to carrying out processing on the workpieces while the workpiece carrier is on the transfer arrangement 2 so long as the workpiece carrier is fixed on the transfer arrangement such as by means of indexing rails 5 and indexing strips 4 of the type shown in FIG. 4. In such case, the workpiece carrier can be lifted by transfer arrangement 2 to any desired height whereupon the workpiece carriers can be rotated, if desired, to any angular position.

Obviously, numerous modifications and variations of the present invention are possible in the light of the above teachings. It is therefore to be understood that within the scope of the claims appended hereto, the invention may be practiced otherwise than as specifically disclosed herein.

What is claimed is:

1. Conveyor apparatus, comprising:
   first conveyor means including a pair of first conveyor members having elongate, longitudinally extending parallel runs transversely spaced from each other by a first transverse distance;
   at least one second conveyor means including at least one pair of second conveyor members having elongate, longitudinally extending parallel runs transversely spaced from each other by a second transverse distance and located in a second plane displaced from a first plane containing said runs of said first conveyor members;
   workpiece carriers supported on said first conveyor members of said first conveyor means for conveyance thereon, each workpiece carrier having at least one longer outer dimension greater than said first transverse distance and at least one shorter outer dimension less than at least one of said first and second transverse distances, said workpiece carriers being bilaterally supported on said first conveyor members in a first angular position with said longer outer dimensions thereof aligned in the direction of said first transverse distance so that said workpiece carriers are each supported by both of said first conveyor members;

workpiece transfer means comprising workpiece rotation means and workpiece vertical movement means, said workpiece carriers and workpiece carrier transfer means including means for coupling a workpiece carrier to said transfer means, said coupling means including first indexing rails provided on an underside of each of said workpiece carriers and second indexing rails provided on said transfer means adapted to operatively cooperate with said first indexing rails, said rotation means comprising means for rotating a workpiece carrier to second angular position wherein said shorter outer dimension thereof is aligned in the direction of one of said first and second transverse distances, and said vertical movement means comprising means for vertically moving a workpiece carrier in said second angular position through the transverse space between one of said pair of first conveyor members and said pair of second conveyor members.

2. The combination of claim 1 wherein said workpiece carriers each have a substantially rectangular configuration and wherein said longer and shorter outer dimensions comprise the length and width of said workpiece carrier.

3. The combination of claim 1, wherein said second plane in which said runs of said second conveyor members are located is vertically below said first plane containing said runs of said first conveyor members, said at least one shorter outer dimension of said workpiece carriers is less than said first transverse distance at which said runs of said first conveyor members are spaced from each other, said workpiece carrier rotation means comprise means for rotating a workpiece carrier to a second angular position wherein said shorter outer dimension thereof is aligned in the direction of said first transverse distance, and said vertical movement means comprise means for vertically lowering a workpiece carrier in said second angular position substantially into said second plane of said runs of said second conveyor members with said workpiece carrier moving through the transverse space between said pair of first conveyor members.

4. The combination of claim 1 wherein, said second plane in which said runs of said second conveyor members are located is vertically above said first plane containing said runs of said first conveyor members, said at least one shorter outer dimension of said workpiece carriers is less than said second transverse distance at which said runs of said second conveyor members are spaced from each other, said workpiece carrier rotation means comprise means for rotating a workpiece carrier to a second angular position wherein said shorter outer dimension thereof is aligned in the direction of said second transverse distance, and said vertical movement means comprise means for vertically raising a workpiece carrier in said second angular position substantially into said second plane of said runs of said second conveyor members with said workpiece carrier moving through the transverse space between said pair of second conveyor members.

5. The combination of claim 1 wherein said workpiece carrier transfer means comprise a substantially vertically drivable lift and wherein said workpiece carrier rotation means are provided on said lift.

6. The combination of claim 5 wherein said workpiece carrier rotation means include means for coupling a workpiece carrier to said lift.

7. The combination of claim 1 wherein said first conveyor members of said first conveyor means extend at least between a starting region and a transfer region thereof, and wherein said second conveyor members of said second conveyor means extend at least between a transfer region and an end region thereof, said transfer and end regions of said second conveyor means being substantially aligned with and vertically displaced from transfer and starting regions of said first conveyor means respectively, and wherein said workpiece transfer means are situated at said transfer regions of said first and second conveyor means, whereby workpiece carriers can be conveyed from said starting region of said first conveyor means to said transfer region of said first conveyor means, transferred to said transfer region of said second conveyor means and conveyed therefrom to said end region of said second conveyor means aligned with said starting region of said first conveyor means.

* * * * *